United States Patent
Watkins

(10) Patent No.: US 6,712,269 B1
(45) Date of Patent: Mar. 30, 2004

(54) COUNTING APPARATUS

(75) Inventor: Trevor Anthony Watkins, Essex (GB)

(73) Assignee: Dine O Quick (UK) Limited, Essex (GB)

( * ) Notice: Subject to any disclaimer, the term of this patent is extended or adjusted under 35 U.S.C. 154(b) by 0 days.

(21) Appl. No.: 10/089,140

(22) PCT Filed: Sep. 19, 2000

(86) PCT No.: PCT/GB00/03584

§ 371 (c)(1),
(2), (4) Date: Mar. 22, 2002

(87) PCT Pub. No.: WO01/24118

PCT Pub. Date: Apr. 5, 2001

(30) Foreign Application Priority Data

Sep. 29, 1999 (GB) .............................................. 9922931

(51) Int. Cl.7 ............................................... G06F 17/60
(52) U.S. Cl. ............. 235/385; 235/462.31; 235/472.31; 235/472.01; 235/462.22; 235/462.45
(58) Field of Search ................ 235/385, 66 A, 235/99 A, 462.31, 472.01, 462.22, 462.45

(56) References Cited

U.S. PATENT DOCUMENTS

| 4,912,748 | A |   | 3/1990  | Takashi et al. |
|-----------|---|---|---------|----------------|
| 5,187,688 | A |   | 2/1993  | Makoto |
| 5,417,487 | A | * | 5/1995  | Dahnert ....................... 312/201 |
| 5,519,784 | A | * | 5/1996  | Vermeulen et al. ......... 382/100 |
| 5,576,627 | A | * | 11/1996 | McEwan ..................... 324/639 |
| 5,656,801 | A | * | 8/1997  | Goren et al. .............. 235/98 R |
| 5,850,082 | A | * | 12/1998 | Eaton et al. ................. 250/221 |
| 5,864,286 | A |   | 1/1999  | Douglas et al. |

FOREIGN PATENT DOCUMENTS

| GB | 0 828 233 | 3/1998 |
| WO | 97/22089  | 6/1997 |

* cited by examiner

Primary Examiner—Thien M. Le
Assistant Examiner—Allyson Sanders
(74) Attorney, Agent, or Firm—Smith-Hill and Bedell

(57) ABSTRACT

An apparatus is described for counting the number of people crossing from one side of a given threshold to the other. The apparatus comprises a plurality of sensing means (10) for mounting above the threshold, each capable of detecting an item passing beneath it. Processing means compare the detection signals of each pair of adjacent sensing means to prevent the same person from being counted separately by the adjacent sensing means.

5 Claims, 2 Drawing Sheets

COUNTING APPARATUS

FIELD OF THE INVENTION

The present invention relates to counting apparatus and is particularly concerned with apparatus for counting the number of items crossing from one side of a given threshold to the other.

BACKGROUND OF THE INVENTION

There are many applications in which it is desirable or necessary to count the number of items crossing a threshold. For example, in order to be able to comply with fire safety requirements, it is important to know the number of people present in a room or building and the invention will for convenience be described by reference to apparatus for performing this function. The apparatus of the invention is not however restricted to use in buildings, as it can be used for example to monitor crowds in railway stations or football grounds. Indeed, the apparatus of the invention need not even be used to count people as it could be used to count animals or even inanimate objects as they pass a given threshold.

It has been proposed to count people as they cross a threshold, such as a doorway, by viewing the entire threshold using a television camera and performing complicated image analysis to determine which parts of the image corresponding to individuals to be counted and the direction in which each individual is travelling across the threshold. The complexity of such a system is reflected in its cost and it is not economically viable in many, indeed most, applications.

A simpler system in use involves "beam breaking". A radiation beam, which may be of visible or infra-red light, is transmitted parallel to the threshold from one side and is either detected on the other side or reflected back by a mirror on the other side to a detector positioned on the same side as the transmitter. If a person crosses the threshold, the light beam is interrupted and the presence of the person can be sensed in this manner. If two such beams are used and spaced in the direction of travel across the threshold, a comparison of the signals from the two sensors will also indicate the direction in which a person has travelled, thereby allowing the people count to be incremented and decremented as people arrive and leave.

The problem with known beam breaking systems is that they cannot be relied upon when it is possible for more than one person to cross the threshold at the same time. This is because the systems cannot distinguish between a single person and two or more people walking side by side. Hence, beam breaking systems are usually used in conjunction with partitions that constrain people into walking in a single file past the sensors. However, partitioning an entrance and exit doorway in this manner is unacceptable as it restricts the rate at which people can pass through it and can constitute a serious hazard in the event of a fire.

OBJECT OF THE INVENTION

The present invention seeks therefore to provide a counting apparatus that can be produced inexpensively but can count items as they cross a threshold that is wide enough to accommodate several items simultaneously.

SUMMARY OF THE INVENTION

According to the present invention, there is provided an apparatus for counting the number of items crossing from one side of a given threshold to the other, comprising a plurality of sensing means for mounting along the threshold and each capable of detecting an item passing through a section of the threshold, and processing means for comparing the detection signals of each pair of adjacent sensing means to prevent the same item from being counted separately by the adjacent sensing means, wherein the sensing means comprise an array of identical modules, each of the modules being connected to the adjacent modules and having an internal processor programmed to compare the detection signals generated by the module with the detection signals of the adjacent modules.

It is preferred for the sensing means to be mounted in use above the threshold and for each sensing means to detect when an item passes beneath it. However, the sensing means could be arranged below the threshold.

The apparatus of the invention can monitor a wide threshold because, instead of the entire threshold being monitored by the breaking of a single beam, each of the sensing means analyses a different section of the threshold. If two people should cross different sections of the threshold at the same time, then they will be detected by different sensing means and counted separately.

However, processing the signals from the different sensing means independently of one another would lead to counting errors, for reasons that will now be explained. If each section monitored by one sensor is only as wide as a person and the sections are contiguous a person crossing half way between two adjacent sensors would be detected by both sensors. This problem cannot be avoided by simply increasing the spacing between sensors as this would leave parts of the threshold unmonitored and it is aggravated by the fact that there is a wide variation in the size of different individuals.

A further source of counting errors arises on account of the fact that the direction of movement of people through the threshold should not be constrained by partitions. Consequently, the counting apparatus must be able to allow for a person entering the threshold through one section and leaving through another.

To avoid the same item being counted separately by two or more sensing means, in the present invention a detection of one person is carried out by analysing the outputs of a plurality of adjacent sensing means to ensure that the person is counted by one and only one of the sensing means.

The individual sensing means may comprise any form of sensors, for example acoustic or passive infra-red, but it is preferred that each sensing means should comprise a pair of infra-red sources spaced along a line perpendicular to the threshold and detecting means for detecting light reflected by a person passing beneath the infra-red sources, the detecting means being capable of distinguishing between the light emitted by the different sources.

Preferably, the infra-red sources transmit light of the same wavelength but at different times and the detecting means comprises a single detector for detecting light from both sources reflected by a person passing beneath the detector.

It is an important advantage of the apparatus of the invention that the use of a modular array avoids the need to design a special system for each installation and enables a threshold of any size to be monitored by linking together the appropriate number of modules.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
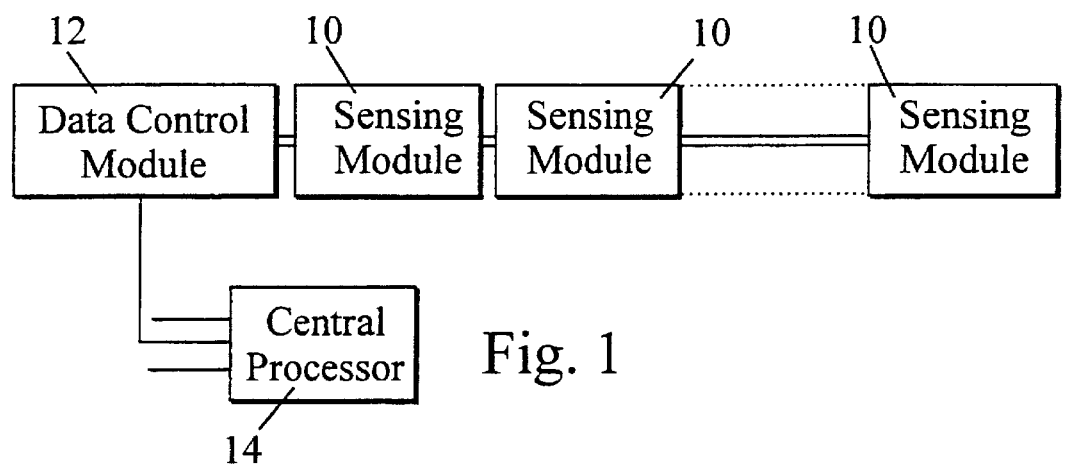
FIG. 1 is a block schematic diagram of an apparatus of the invention for counting people.
Figure 2:
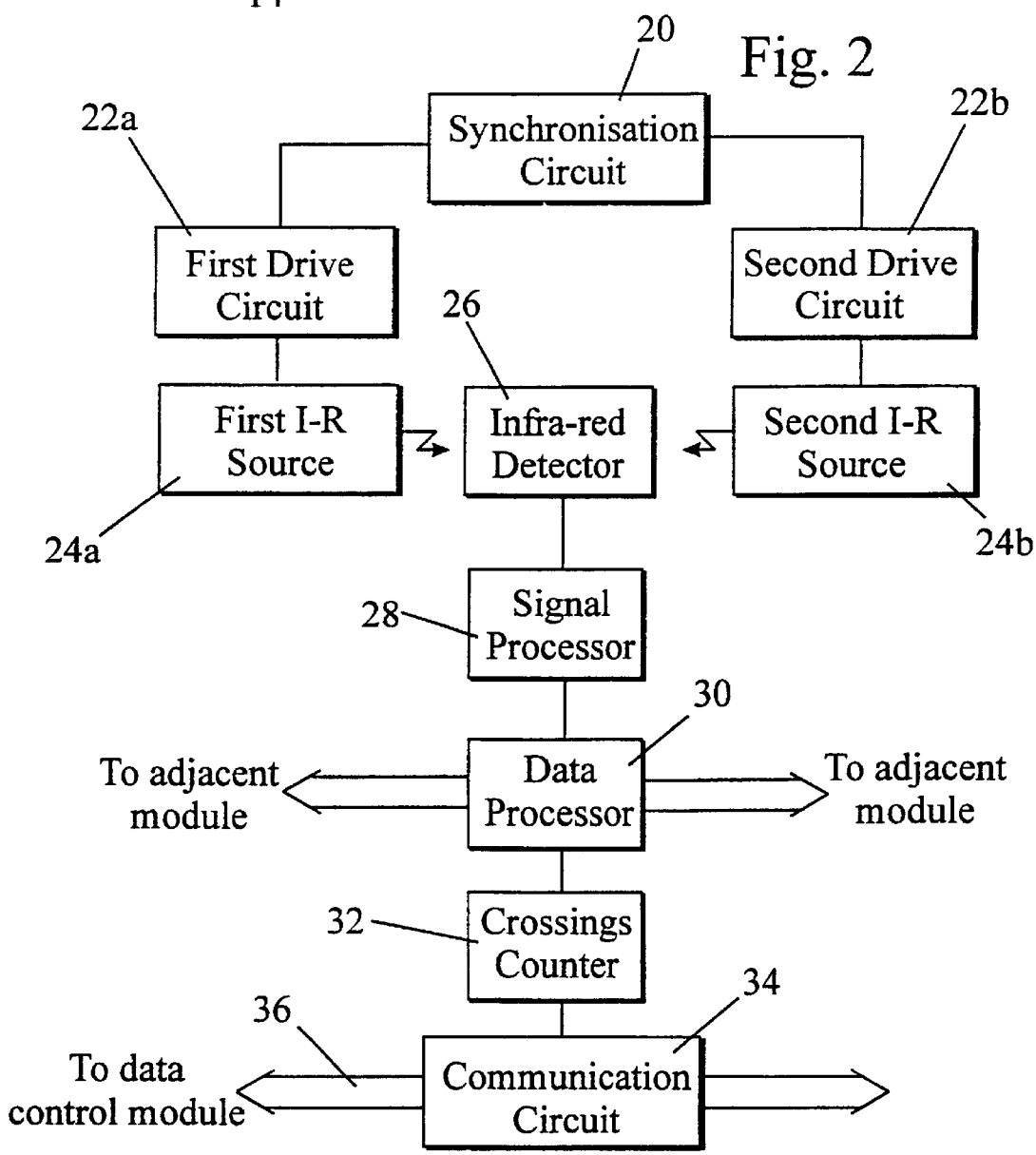
FIG. 2 is a more detailed block circuit diagram of one of the sensing modules.
Figure 3:
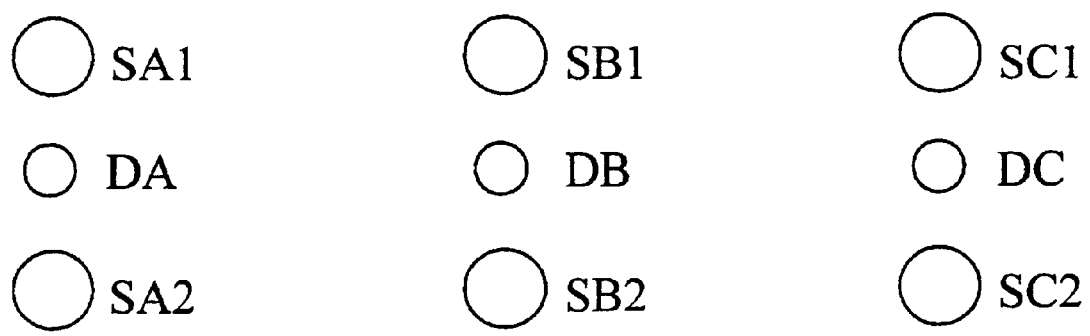
FIG. 3 shows schematically the positioning of the infrared sources and detectors in a sensor array for positioning above a threshold.

A counting apparatus of the preferred embodiment of the invention as illustrated in FIG. 1 comprises an array of sensing modules 10 arranged in line with one another above a threshold, each module being able to detect a person crossing a respective section of the threshold arranged beneath the sensing module 10. The modules 10, as will be described below by reference to FIGS. 2 and 3, are intelligent modules that are connected to another in a daisy chain in addition to being connected to a common data bus. A data control module 12 is located on the same data bus and this in turn communicates with a central processor 14 which may be a personal computer or a dedicated processor.

In operation, each sensing module 10 detects when a person passes beneath it from one side of the threshold to the other. After steps are taken by the processors within the modules 10 to ensure that the same person is not counted more than once, counts of the persons crossing in both directions are stored within the modules. Upon request from the data control module 12, these counts are passed to the data control module 12 and the counts within the individual modules 10 are reset. The control module 12 performs additional calculations on the counts received from the individual sensing modules 10 and determines for example the net number still present in the space on one side of the threshold. This information is upon request relayed to the central processor 14 which may receive similar information from other sensor arrays and in this way determine for example the occupancy of different areas in the same building. The central processor may then provide output on a screen or on a printer to the operator. A visual display may additionally be provided on the data control module 12 if desired.

FIG. 3 shows the position of the sensors and detectors in three modules 10 of a sensing array. Each module comprises two infra-red sources, for example SA1 and SA2, and a detector for example DA. The threshold is the plane passing through the detectors DA, DB and DC. The infra-red sources SA1 to SC2 are synchronised to operate one at a time so that for example while SB1 is transmitting none of the adjacent sources SA1, SA2, SB2, SC1 and SC2 is doing so. If source SB1 is transmitting infra-red and detector DB senses infrared radiation at the same time, then the system determines that a person is present in the section of the threshold lying beneath the module B. The light emitted from each source SB1 and SB2 while it is operating is also modulated so that detector DB may disregard ambient light reflected from other sources.

It will be appreciated of course that instead of two sources and one detector, each module could have two detectors and one source or even two sources and two detectors. The important point is only that each module should be able to determine the direction of travel of a person through the threshold. To this end, it is important to space the sensors and detectors in each module such that, having regard to the cycle repetition frequency of each source/detector sensor pair, a person crossing the threshold at a realistic speed will be detected first by the sensor on only one side of the threshold, then by both sensors and finally by the sensor on the other side.

The hardware contained within each of the sensing modules is shown in FIG. 2. A synchronisation circuit 20 receives a signal from a clock source common to all the modules 10 and determines the times when its sensors may operate without interfering with the operation of adjacent modules. Two infra-red sources 24a and 24b in each module have respective drive circuits 22a and 22b that apply a modulated sequence of current pulses to the sources at the appropriate times. The two sources 24a and 24b are operated at different times in each cycle so that a common detector 26 can be used to sense light from either source reflected by a person crossing the threshold.

The output from the detector 26 is analysed first by a signal processor 28. This part of the hardware is responsible only for determining if a person is present based on the output signal of the detector. In particular, the signal processor 28 may take several samples from the detector 26, select the best signal available from the different samples and then compare the best signal with a given reference value to determine if the signal is a valid reflection from a person crossing the threshold.

The output of the signal processor is passed to a data processor 30 which is connected to the corresponding data processors of the adjacent modules. The data processor 30 analyses the pattern of outputs from its own sensors to determine the direction in which a person has crossed and communicates with the adjacent data processors 30 to ensure that the detected person has not already been counted by the adjacent modules. If it is the first to count a person then it increments the appropriate one of two counts stored in a crossings counter 32 and it transmits an inhibit signal to the adjacent modules to prevent them from counting the same person.

Each module also includes a communication circuit 34 that is connected by way of a common data bus 36 to the data control module 12.

The various blocks 20, 22, 28, 30, 32 and 34 perform different functions and have for this reason been represented separately but it will be appreciated that all these functions can be performed by a single suitably programmed processor.

Because the different modules 10 do not operate independently but interact with one another when detecting a person crossing the threshold, the detection algorithm implemented by the data processor 30 may be designed to recognise any pattern of movement through and/or along the threshold.

In the preferred embodiment of the invention, the modules are positioned to monitor contiguous sections of the threshold which are sized such that the smallest person will be detected by at least one module and the largest by no more than three modules. Thus if two people walking together in the same direction activate four sensors, then module that counts one person crossing will disable the counting in its immediate neighbours, as described above, but the fourth activated will not be disabled and will count a second person.

In addition to disabling the counting in the adjacent module, it is advantageous in some instances for one module to transmit signals that not inhibit its immediate neighbour but also instruct the immediate neighbour to inhibit the next module along the array. This is required if two people cross the threshold at the same time but in opposite directions. Supposing for example in the array of FIG. 3, the B module produces the sequence of signals SB1, SB1+SB2, SB2 while the A module produces the sequence SA2, SA1+SA2, SA1. As these are counts of persons moving in opposite directions, neither will inhibit the other. However, as the system must allow for a person being detected in three adjacent module, module B must not only inhibit a count in module C but also in module C's other neighbour (not shown in the drawing).

A person crossing the sensor array at an angle may for example activate the sensors in the array of FIG. 3 in the order, SA1, SB1+SB2, SB2. This situation may readily be detected by the occurrence of the combination SB1+SB2 without being preceded by SB1 alone or SB2 alone. At this point, the module B looks to its adjacent module A and finds that an SA1 detection has occurred on the adjacent A module. The B module therefore assumes that a person has entered from side 1. In due course, the SB2 detection occurs, the person is counted by module B as having crossed from side 1 to side 2 and it will inhibit the adjacent modules in the manner previously described. The direction from which a person has entered the threshold may in this way be passed from one module to the other until such time as the person leaves the threshold from one side or the other.

The invention does not of course reside in the algorithm implemented in the modules but in the fact that a comparison is made of the outputs of several adjacent sensors before a count is incremented.

It will also be appreciated that as detection of valid crossings is essentially performed on the basis of the recognition of the pattern or sequence of detection by the different sensors in an array, it lends itself to an artificial intelligence approach based on a neural network rather than a digital data processor performing logic analysis on the sequence of signals.

As the algorithm of when to count, when to inhibit the adjacent module and when to pass on data regarding partial crossings from one module to another is the same in all modules, these may essentially be identical and differ from each other in so far as concerns the timing of the synchronisation circuit. It is possible for the clock signal to comprise four signals in phase quadrature and to connect the synchronisation circuits of the different modules to different phases of the same clock signal. This will mean that an infra-red source will operate at the same time as one four modules away, but the separation will be sufficient for the modules not to interfere with one another.

Because the modules are identical, any number of them may be connected into a series array allowing any length of threshold to be accommodated by using the appropriate number of module. For each array, only one data control module 12 is required and the same control module may be used regardless of the number of modules. This approach makes for simple installation and maintenance.

What is claimed is:

1. An apparatus for counting items crossing from one side of a given threshold to another, comprising a plurality of identical sensing modules mounted along the threshold and spaced apart along a line transverse to a direction of travel across the threshold for monitoring respective sections of the threshold, each module generating a detection signal when it detects an item passing through its section of the threshold, and wherein each of the modules is connected to the or each adjacent module and has an internal processor programmed to compare the detection signals generated by the module with the detection signals of the or each adjacent module to prevent the same item from being counted separately by the adjacent module.

2. An apparatus as claimed in claim 1, wherein the sensing modules are mounted in use above the threshold and each sensing module is operative to detect when an item passes therebeneath.

3. An apparatus as claimed in claim 2, wherein the individual sensing modules each comprise a pair of infra-red sources spaced along said direction of travel and detecting means for detecting light reflected by an item passing beneath the infra-red sources, the detecting means being capable of distinguishing between the light emitted by the different sources.

4. An apparatus as claimed in claim 3, wherein the infra-red sources are operative to transmit light of the same wavelength but at different times and the detecting means comprises a single detector for detecting light from both sources reflected by a person passing beneath the detector.

5. An apparatus as claimed in claim 1, further comprising a central processing means connected to all the modules.

* * * * *